Dec. 17, 1935.    O. RISZDORFER    2,024,661
APPARATUS FOR CONTROLLING PHOTOGRAPHIC EXPOSURES
Original Filed Oct. 23, 1930    2 Sheets-Sheet 1

Inventor:
Odon Riszdorfer,
By Newton M. Ferris
Rolla N. Carter
Attorneys

Dec. 17, 1935.  O. RISZDORFER  2,024,661
APPARATUS FOR CONTROLLING PHOTOGRAPHIC EXPOSURES
Original Filed Oct. 23, 1930   2 Sheets-Sheet 2
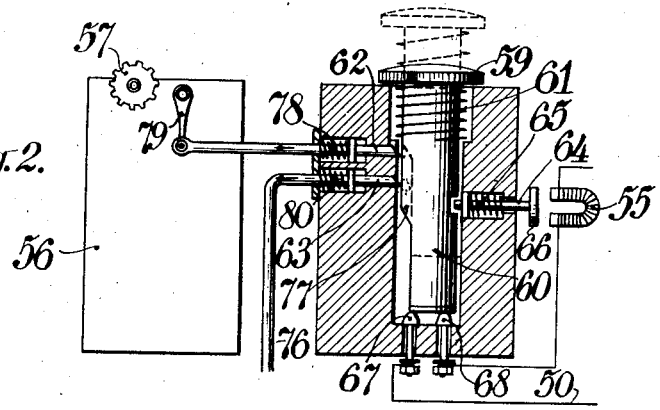
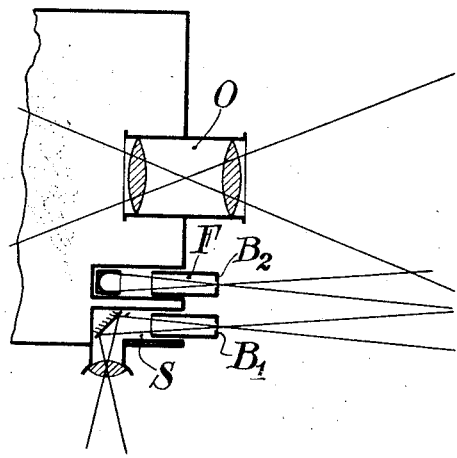
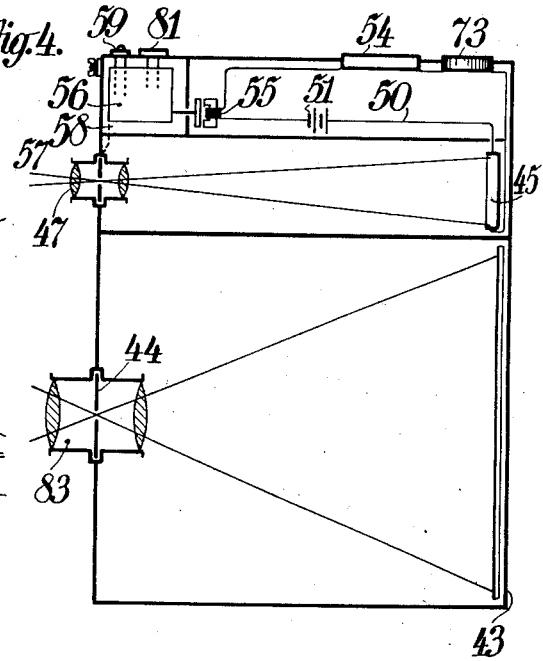
Inventor:
Odon Riszdorfer,
By Newton M. Purvis
Rolla L. Carter
Attorneys Patented Dec. 17, 1935

2,024,661

UNITED STATES PATENT OFFICE 2,024,661

APPARATUS FOR CONTROLLING PHOTOGRAPHIC EXPOSURES

Odon Riszdorfer, Budapest, Hungary

Original application October 23, 1930, Serial No. 490,766. Divided and this application September 15, 1934, Serial No. 744,271. In Italy, Switzerland, Czechoslovakia, and Austria October 22, 1931

5 Claims. (Cl. 95—10)

This invention relates to an arrangement for the automatic regulation of the length of time of exposure in taking photographic pictures, for which purpose a photo cell is employed.

This application is a division of my application Serial Number 490,766 filed October 23, 1930 which issued September 25, 1934 as Patent No. 1,974,433.

In photographing scenes under different lighting conditions it is difficult to estimate correctly the exposure which should be used to insure the best possible results. The subject matter of many scenes as well as the limitations of the camera objective employed makes it desirable in many instances to adjust the diaphragm of the objective for these factors and to control the exposure by varying the exposure period.

It is an object of my invention to provide for photographic apparatus a device including a light sensitive cell which will govern the exposure period to insure proper exposure when a known diaphragm opening is used and the sensitiveness of the film is also known. Other features and advantages of my invention will appear from the following description when read in connection with the accompanying drawings, and its scope will be pointed out in the appended claims.

In the accompanying drawings like characters of reference indicate like parts in the several views and Figure 1 is a perspective view, partly broken away, showing a camera equipped with one form of the invention.

Figure 2 is a detail view, partly in section, of certain elements used in the form shown in Figure 1.

Figure 3 is a diagrammatic view of one arrangement of the device as shown in Figure 1.

Figure 4 is a diagrammatic view showing a somewhat different arrangement of the parts of Figure 1.

Figure 1:
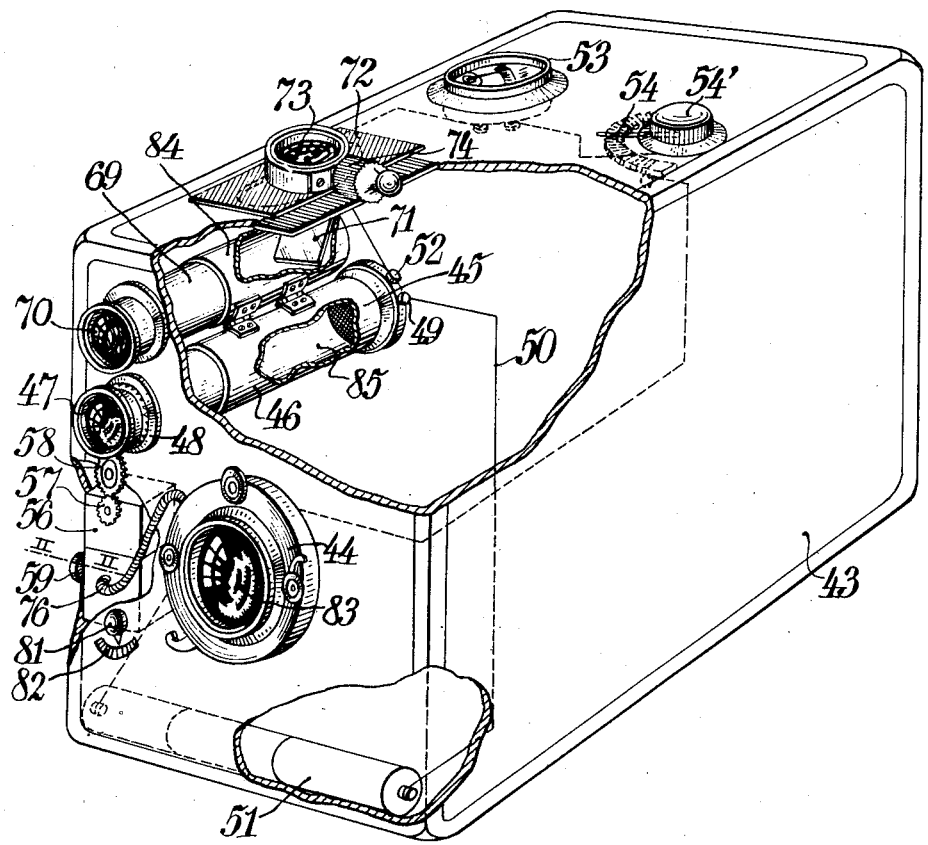

In the arrangement shown in Figure 1, which is well adapted for time exposures, 43 is the casing wherein is supported the mounting for the shutter 44, object lens 83 and the diaphragm, these parts being of usual construction. A photo-cell 45 is arranged in the telescopic tube 46 and is exposed through the lens 47. Arranged behind this lens 47 is an iris diaphragm 47' as shown in Figure 4. This diaphragm is opened and closed by means of a toothed wheel 48 and is completely shut before and after exposure. One of the terminals 49 of the photo-cell is connected with the source of current 51 by means of a wire 50. The other terminal 52 is connected in series with the armature 53, the regulatable resistance 54 and with the other pole of the source of current 51 through the electro-magnet 55 (Figures 2 and 4). A clock work mechanism 56 arranged in the casing 43 operates the diaphragm 48 of the photo-cell 45 by means of toothed wheels 57 and 58. The control for the mechanism is shown in Figure 2. To start the mechanism, the button 59 is pushed down. The button 59 carries a bolt 60. Figure 2 shows the button 59 in pressed-down position in full lines and raised in dotted lines. The bolt 60 of the button, after the resistance of the spring 61 has been overcome, moves into its pressed down position, in which it presses against pins 62 and 63, whose function will be hereinafter more fully explained. 64 is a locking pin which, through the pressure of the spring 65, is urged into locking position, but which is retracted out of such locking position, when the current becomes sufficiently strong by means of an electro-magnet 55 which acts upon the bolt head 66 functioning as an armature. The bolt 60 in its pressed-down position, closes the circuit 59 by means of contacts 67 and 68 and breaks the circuit by moving upwardly when locking bolt 65 is being retracted.

Connected to the telescopic tube 46 of the photo-cell is a second telescopic tube 69. In other words, the slidable tube members 84 and 85 of the said telescopic tubes are attached to each other. The two tubes are arranged parallel to each other. Telescopic tube 69 has at its front end a lens 70. In its back portion the telescopic tube 84 is provided with a small mirror 71 and is connected to a slide 72 which is slidingly arranged on the outer wall of the camera. Disposed in a hole of the slide above the mirror is a search-lens 73. The slide 72 can be shifted in the direction of the axis of the tube 69 with the result that the mirror 71 can be moved closer to or further away from the lens 70. The tube 85 of the photo-cell automatically participates in this shifting motion. The shifting is done by means of a pinion 74 which engages a rack 75. The control device mounted on the casing 43 adjacent the slide 72 is, by means of the flexible shaft 76, connected with the releasing mechanism of the shutter of the object lens. This release mechanism is of the usual type wherein the pressure of a button releases the shutter.

The tension of the spring of the mechanism 56 is regulated through turning of the knob 81.

The pointer of the knob 81 moves over a scale 82. Tensioning of the spring of the mechanism or clockwork controls the working speed of the clock work. The larger the opening width of the diaphragm (of object lens 83) used for the exposure the more the spring of the clock work will be tensioned. To facilitate the operation it is advisable to graduate the scale 82 in conformity with the opening diameters of the diaphragm to be selected.

The apparatus described above is constructed for time exposures, i. e. particularly for use in studios, and operates as follows:

After the diaphragm of the object lens 83 has been set and the spring tensioned through turning the knob 81, the button 59 is pushed down, whereupon the stop 77 of the bolt 60 forces the pin 62 against the spring 78 in the direction of the arrow, causing thereby the lever 79 to swing to the left and to start clock work 56. When the bolt 60 continues its downward movement, the pin 63 is pushed by the stop 77 against the spring 80 and is likewise forced to the left. The pin 63 actuates a flexible shaft 76 by means of which the shutter of the object lens is released. At the same time, the circuit 50 is closed through contacts 67 and 68, and the clock work 56 begins to open, by means of toothed gear wheels 57, 58, 48, the completely closed diaphragm of the object lens 47 of the cell. The more the diaphragm is opened the stronger will be the current which flows through the circuit 50 of the photo-cell. When a predetermined strength of current is reached, the armature 66 is attached by the magnet 55 and the bolt 60 is thereby released. The latter, by means of the spring 61 is forced back into its dotted line position. At the same time, the pin 63 is forced back to the right by spring 80 whereby the shutter of the camera is closed. And also the pin 63 is forced back to the right by the spring 78, whereby the clockwork is stopped and the diaphragm of the object lens 47 of the cell is completely closed. The resistance 54 serves to regulate the circuit 50.

In case of exposures in which the object to be photographed shows considerable differences in brightness the photo cell should be adjusted only to the dark portions of the picture. The pair of tubes 84, 85 should therefore be adjusted by means of the driver 74, 75 to reduce the angle of the picture until only the dark portions remain visible in the search lens 73. In this way the exposing time is lengthened. Lens light will get into the cell, and the current in the circuit 50 will increase slower in intensity.

While for convenience I have shown the invention as applied to a camera of the box type, it will be understood that my invention may be employed in conjunction with other photographic apparatus where it is desired to control a timing element in accordance with the intensity of a selected beam of light.

I have chosen the particular embodiments described above as illustrative of my invention, and it will be obvious that various other modifications may be made without departing from the spirit and scope of my invention, which modifications I intend to cover by the appended claims.

What I claim as new and desire to secure by Letters Patent of the United States, is:

1. The combination with a camera having a shutter and means operating under pressure to open the shutter and hold it in open position; of a latching mechanism for said shutter opening means and including a latch pin, an electromagnet associated with said latch pin to release the latching means upon energization to a predetermined extent, a source of current, a light sensitive cell, conductive connections between the electromagnet, source of current and cell connecting them in series, a variable speed clockwork mechanism, a speed controlling device for the clockwork mechanism, a normally closed diaphragm controlling the admission of light to said cell, an operative connection between said diaphragm and clockwork mechanism arranged to effect opening of the diaphragm as the clockwork operates, and means for effecting starting and stopping of the clockwork mechanism, said last means being operated by the movements of said latching device.

2. The combination with a camera having a shutter and means operating under pressure to open the shutter and hold it in open position; of a latching mechanism for said shutter opening means and including a latch pin, an electromagnet associated with the said latch pin to release the latching means upon energization to a predetermined extent, a source of current, a light sensitive cell, conductive connections between the electromagnet, source of current and cell connecting them in series, a focusing lens for said cell arranged to receive light from the object to be photographed and focus it on the cell, and visually observable means for regulating the focusing of the lens on a definite part of such object.

3. The combination with a camera having a shutter biased to closed position and means for opening the shutter, means for holding the shutter in open position, a light sensitive cell, a device responsive to a predetermined output of the cell for releasing said shutter holding means, and means for uniformly varying the response of said cell.

4. The combination with a camera having a shutter biased to closed position, means for opening the shutter and means for holding the shutter open, a light sensitive cell, a device operative to release said shutter holding means when the response of the cell reaches a predetermined value, a normally closed diaphragm controlling the admission of light to said cell, and means for uniformly opening said diaphragm.

5. Photographic apparatus comprising means for supporting a sensitized layer in position to be exposed to light and means for terminating the exposure, a light sensitive device responsive to light of an intensity which bears a known ratio to the intensity of the exposing light, means for uniformly increasing the intensity of the light falling on said device, and means for actuating said exposure terminating means when the response of said device reaches a predetermined value.

ODON RISZDORFER.